United States Patent [19]

Huffman

[11] 4,043,749
[45] Aug. 23, 1977

[54] PROCESS FOR DYEING BLENDED NYLON CARPET MATERIAL

[75] Inventor: Allan M. Huffman, Lock Haven, Pa.

[73] Assignee: American Color & Chemical Corporation, Charlotte, N.C.

[21] Appl. No.: 698,754

[22] Filed: June 22, 1976

[51] Int. Cl.$^2$ .............................................. D06P 1/38
[52] U.S. Cl. ...................................... 8/1 XB; 8/21 B; 8/26; 8/39 B; 8/41 B; 8/178 R; 260/206
[58] Field of Search ............ 8/1 C, 21 B, 41 B, 1 XB, 8/21 B, 41 B, 26; 260/205

[56] References Cited

U.S. PATENT DOCUMENTS

| | | | |
|---|---|---|---|
| 2,922,690 | 1/1960 | Mueller | 8/21 |
| 3,389,549 | 6/1968 | David | 57/14 D |
| 3,485,814 | 12/1969 | Speck | 260/186 |
| 3,706,524 | 12/1972 | Flensberg | 8/21 A |

OTHER PUBLICATIONS

Colour Index, Third Edition, vol. 4, p. 4047 C.I. 13150.

*Primary Examiner*—Joseph L. Schofer
*Assistant Examiner*—A. L. Clingman

*Attorney, Agent, or Firm*—Armstrong, Nikaido & Marmelstein

[57] ABSTRACT

An improved process for dyeing nylon carpeting material which is tufted or woven from a blend of cationic dyeable nylon yarns and acid dyeable nylon yarns is provided. Staining of the cationic dyeable portion is substantially eliminated and red and dull shades on the deep dyeing acid dyeable nylon is avoided by using as the acid dye a member of a small class of monoazo dyes made by coupling an appropriate diazotized aminobenzene sulfonic acid into N-ethyl-N-phenylbenzylamine. The monoazo dyes of the invention are applied to the carpet material along with an appropriate cationic dye in a conventional application procedure. The use of the monoazo dyes according to the invention produces a dyed blended nylon carpet material in which the cationic dyeable portion is not appreciably dyed or stained by the acid dye and in which the acid dyeable portion is characterized by outstanding light fastness and excellent transfer properties. Deep dyeing acid dyeable nylon is dyed a bright crisp shade with the monoazo dyes according to the invention.

4 Claims, No Drawings

PROCESS FOR DYEING BLENDED NYLON CARPET MATERIAL

BACKGROUND OF THE INVENTION

A great many water soluble dyes which contain sulfonic acid substitutes have been made over the past century. Such dyes have traditionally found application as acid dyes for woolen fabric materials. With the development of nylon, certain of the acid dyes have been used as colorants for nylon fiber. Although extensive research has been conducted in this area of dye chemistry, recent demands for dyes with specific properties applicable to new fabric materials has rendered many of the earlier dyes inadequate for modern needs.

One example of a specialized area of dye application is carpet dyeing, and particularly, nylon carpet dyeing. In the dyeing of carpets it is necessary to provide a dye with excellent "transfer" properties, i.e., the ability to produce level dyeings even in heavy carpets and with filaments of a large diameter. In the dyeing of nylon carpeting other problems occur which are caused by variations in the carpeting itself. For example, nylon carpeting may have localized areas of differing crystallinity, due perhaps to differing stresses established in the cold drawing to which the fiber is subjected during manufacture. Such localized areas accept acid dyes at different rates and in varying amounts, depending upon the physical characteristics of the carpet in each area. With a dye of excellent transfer properties, it is possible to dye such carpeting with an evenness not possible with dyes lacking these properties. In addition to transfer properties, fastness to light is also an important consideration.

The need for finding dyes capable of adequately dyeing nylon carpeting is emphasized by the fact that nylon is the most important fiber used in the United States for carpeting. It has been reported that, in 1972, 925 million pounds of nylon was used in carpeting, an amount representing 65.6% of all fibers used in U.S. carpet manufacture. It is estimated that this amount will increase to 1714 million pounds by 1978.

Available nylon carpet fiber is generally classified as to type, depending upon its receptivity to acid dyes and basic or cationic dyes. Cationic dyeable nylon contain $SO_3H$ groups or COOH groups which are receptive to cationic or basic dyes. Acid dyeable nylons are essentially conventional nylons, such as polyhexamethylene adipamide and polycaprolactam. Acid dyeable nylons vary as to type and are characterized as being weakly dyed with acid dyes, average dyed with acid dyes, or deeply dyed with acid dyes. DuPont Technical Information Bulletin N-260, September, 1972, describes the types of commercially available nylon fibers.

Deep dyeing acid dyeable nylon disadvantageously changes many conventional acid dyes to red and dull shades in moderate to heavy dyeings. By moderate to heavy shades is meant dyeing of about 0.5% owf to about 4% owf.

Tufted or woven carpet material comprising mixtures of the above yarn types will yield attractive multicolored carpet when dyed with appropriate dyes. For example a carpet tufted or woven with a cationic dyeable nylon and an acid dyeable nylon can be dyed with two colors such as yellow and red by dyeing the cationic dyeable portion with a red cationic or basic dye and the acid dyeable portion with a yellow acid dye. The dyeing operation is usually done in one application; that is, both the cationic and acid dye are applied to the carpet in one dyebath or in one application step.

It is essential in the production of multicolor carpets made from styling yarns that the acid dyes used to dye the acid dyeable portion of the carpet do not dye or stain the cationic dyeable portions. Useful acid dyes besides requiring outstanding light fastness and good transfer and leveling properties should dye only the acid dyeable nylon because, in spite of the fact that a minor degree of staining of the cationic dyeable portion can be tolerated, the value of an acid dye for application to carpet containing cationic dyeable nylon is considerably enhanced if, upon application of the dye, the cationic dyeable portion remains substantially unstained. The reason for this is that unstained or very lightly stained cationic or basic dyeable nylon will be brighter when it is dyed with a basic dye. Conversely, as the amount of staining increases, the dyed basic portion will become dull in appearance.

The acid dye, in addition to the above requirements, also should not change shade when dyed in moderate to heavy shades on the acid dyeable nylon. Conventional dyes recommended for acid dyeable nylon of the same shade as dyes of this invention, as stated above, are characterized by the undesirable property of becoming red and dull in heavy dyeings, especially on deep dyeing acid dyeable nylon, such as, for example, DuPont T-847 acid dyeable nylon yarn.

It has now been discovered, according to the present invention, that a small class of monoazo acid dyes possess superior dyeing properties. These dyes are characterized by outstanding lightfastness and outstanding leveling and transfer properties. The dyes are also characterized by low stain on cationic dyeable nylon and by the absence of the property of changing shade to red and dull shades in heavy dyeings, especially on deep dyeing nylon yarn. The class of dyes according to the present invention includes previously unreported dyes and also those of known structure such as C.I. 13150 (C.I. Acid Orange 50). This latter dye was discovered in 1935 and was first used as a wool color.

SUMMARY OF THE INVENTION

In accordance with the invention there is provided a process for dyeing nylon carpeted material, tufted or woven from both cationic dyeable nylon yarn and acid dyeable nylon yarn employing a cationic dye and an acid dye. The improvement according to the invention comprises applying as the acid dye a monoazo dye of the formula:

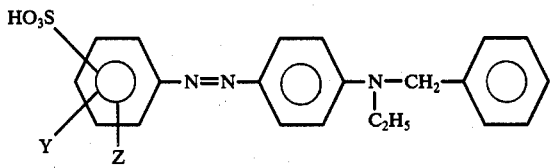

in which Y and Z are independently selected from the group consisting of hydrogen, chlorine, bromine, methyl and methoxy; or a water soluble sulfonic acid salt thereof.

DESCRIPTION OF PREFERRED EMBODIMENTS

The dyes useful according to the invention are characterized by the presence of at least one sulfonic group, either as such or in the form of its water soluble salt such as the sodium, potassium, and nitrogen containing salt forms. The dyes are made by conventional procedures by mixing a diazotized aminobenzene sulfonic acid and N-ethyl-N-benzylaniline.

Typical aminobenzenes useful as a diazotizable base in the coupling reaction are sulfanilic acid; metanilic acid; 4-chloro-metanilic acid; 6-chlorometanilic acid; 2,5-dichlorosulfanilic acid; 4-bromometanilic acid; 3-sulfo-p-toluidine and 4-methoxymetanilic acid.

The diazotizable amine intermediate is diazotized in conventional ways such as by heating it (if necessary to achieve solution) in an aqueous solution of a strong mineral acid such as hydrochloric acid, cooling the resulting solution to a temperature of 0°–10° C and adding thereto a quantity of sodium nitrite slightly in excess of the stoichiometric requirement. An alternate method of diazotization involves dissolving the diazotizable amine in water, adjusting the pH to above 7, adding a quantity of sodium nitrite slightly in excess of the stoichiometric requirement and adding this solution to a solution of excess hydrochloric acid.

The monoazo dyes of the invention are made by the reaction of the diazotized amine with the coupler, usually by adding the diazonium salt to a cold aqueous alkaline solution of the coupler. A buffering agent, such as sodium acetate is usually added to reduce the acidity to a pH of 5–7. The mixture is allowed to react for 1 to 24 hours at 0° C to room temperature and is thereafter filtered. The desired azo product is thus obtained in the form of a wet cake.

As the cationic dyes useful according to the process of the present invention for dyeing the cationic dyeable nylon carpet material there may be used any of the dyes conventionally employed in the dyeing of carpet material comprising both cationic and acid dyeable nylons. Preferred, of course, are the dyes characterized by good lightfastness, wetfastness, and resistance to atmospheric fading. The following cationic dyes are typical dyes employed in the dyeing of cationic dyeable nylon:

| C.I. Number | Color Index Name | Chemical Class |
|---|---|---|
| — | Basic Yellow 15 | Monoazo |
| — | Basic Orange 39 | Monoazo |
| — | Basic Orange 25 | Monoazo |
| — | Basic Red 17 | Monoazo |
| — | Basic Red 23 | Monoazo |
| 52025 | Basic Blue 25 | Thiazine |
| — | Basic Blue 45 | Anthraquinone |
| — | Basic Blue 21 | Anthraquinone |
| — | Basic Blue 47 | Anthraquinone |

The carpet material to be dyed is one tufted or woven from two different types of nylon yarn, one type being a cationic dyeable nylon yarn and the other an acid dye dyeable nylon yarn. In commercially available carpet material the amount of cationic dyeable yarn to acid dyeable yarn is usually in the range of 1:3 to 3:1 (by weight). Generally, cationic dyeable nylon, sometimes referred to as basic dyeable nylon, is one which contains acid groups and is receptive to a cationic or basic dye and resistive to acid dyes. Typical cationic dyeable nylons are described, for example, in U.S. Pat. No. 3,542,724 which discloses nylon terminated with sulfonated benzoyl groups to the extent that the sulfonate to anion ratio ranges between 1.5–3:1. The acid dyeable nylons are more conventional but vary in the uptake of acid dyes. The so-called deep dyeing acid dyeable nylon, such as DuPont's T-847, contains groups having a strong affinity for acid dyes. These groups are probably amine groups. The deep dyeing acid dyeable nylon (as well as the so-called medium acid dyeable nylons), however, are characterized by the undesirable property of causing many acid dyes to turn red and dull in medium to deep shades, i.e., in dyeings from about 0.5% owf to about 4% owf.

Both the cationic dyes and acid dyes may be conveniently applied from an aqueous bath and also by other methods as described in U.S. Pat. No. 3,485,814 and in the examples that follow.

A typical beck dyeing procedure for dyeing acid and cationic dyeable yarns is described below. (The percentages of chemicals given are based on the total weight of the carpet).

1. The carpet is bleach scoured at a dye liquor to total carpet weight ratio of 20:1 to 40:1 by loading the carpet into the bath at about 80°–100° F and adding:
    4% sodium perborate,
    0.5% Aminogen GEC (a commercially available dyeing assistant) and
    0.25 trisodium phosphate.
  The bath is heated to 160°–170° C and run about 15 minutes. The bath is dropped (that is the water drained from the beck) and the carpet is rinsed at 100° F with additional water.

2. The carpet (tufted or woven from a mixture of acid dyeable and cationic dyeable nylon) is then dyed by adding to the water bath at 80°–100° F:
    1.0% Aminogen GEC,
    0.2% tetrasodium pyrophosphate,
    X% monosodium phosphate to give a pH of 6.0 to 6.2, and
    0.25% ethylene-diamine tetracetic acid (sequestering agent).
  The cationic dye is added in an amount to give a desired shade and depth. The bath is held for 10–15 minutes and then the acid dye is added in an amount to give the desired shade and depth. The bath temperature is then raised to 206°–210° F at about 2° F/min, the pH is adjusted, if necessary, to 6.0–6.2, and the bath is held at about 206°–210° for 1 hour. When the shade is correct the dye bath is dropped and the carpet is rinsed with cold water.

The determination of the dyeing and staining characteristics of the dyes used according to this invention was done on nylon carpet tufted with a mixture of commercially available bulk continuous filament nylon (BCF Nylon) in which a cationic dyeable nylon (T-844) was tufted with acid dyeable nylons (T-845, T-846, and T-847). The aforementioned designations are standard commercial names as used in DuPont Technical Information Bulletin N-260, September 1972. The carpet was tufted in four bands each of approximately 2 inches in width and each being made from one of the four types of nylon. The carpet was dyed and the amount of stain on the cationic dyeable nylon (T-844) and the shade of the acid dyeable bands was evaluated.

The use of the dyes selected according to the invention were equal or better in reserving cationic dyeable nylon than the dyes now recommended for commercial use. The low staining feature of the dyes of the invention is quite surprising because it is unexpected that these dyes, being of comparatively simple structure, would have this property. Furthermore, the dyes of this invention dye the deep dyeing acid dyeable nylon, T-847, crisp bright shades, whereas dyes presently used in the art and having this shade are red and dull on the same substrate when dyed in moderate to heavy shades.

The lightfastness of dyed material according to the invention was evaluated using standard AATCC methods using a Xenon Fadometer. Transfer properties were measured by entering into a dyebath containing no dye, a dyed and undyed skein. The dyebath was then held at boiling for one hour and the skeins were removed. If the skeins were dyed equal strength, the dye is judged to have 100% transfer.

The invention is further illustrated by the following examples:

EXAMPLE I

To prepare the dye:

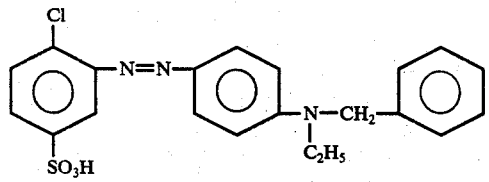

4-chlorometanilic acid (21 g., 0.1 mole) is stirred with 82 g. water and 12 g. of 32% hydrochloric acid. Ice is added to adjust the temperature to 0° C. Then is added 7.1 g. of sodium nitrite dissolved in 22 g. of water. The diazotized 4-chlorometanilic acid is held for 15 minutes with excess nitrous acid, then the excess is destroyed with sulfamic acid.

The coupler solution is prepared by stirring together 150 g. of water, 150 g. of ice, 30 g. of 32% aqueous hydrochloric acid, 4 g. of Tween 20 and 22.2 g. of N-ethyl-N-benzylaniline.

The diazotized 4-chlorometanilic acid is added to the coupler over three hours at 0°-5° C. The coupling mass is stirred 24 hours. The dye is isolated by filtration and dried.

Yield: 38.8 g.

EXAMPLE II

A dyebath is prepared from 0.2 g. of the dye from Example I, 330 ml. water, 10 ml. 10% monosodium phosphate, and 0.2 g. of a dyeing assistant ("Aminogen 41", a commercially available anionic material.) The pH is adjusted to 6.0 with 5% aqueous sodium hydroxide or 5% aqueous acetic acid. A 10.0 g. nylon skein (BCF, T-846, DuPont) is entered into the dyebath. The dyebath is heated to boil and the skein is turned in the boiling bath for one hour. The skein is then removed, soaped, rinsed, and dried. The hue is reddish-yellow.

A similarly dyed skein is placed in a bath prepared as above but without the 0.2 g. of dye. An undyed 10.0 g. skein is added to the bath. Both skeins are turned in the boiling bath for one hour. The skeins are then removed from the bath, soaped, rinsed and dried. The transfer property of the dye is shown by its K/S value. Both the original skein and the previously undyed skein give K/S values of 4.60, showing that the dye has distributed itself equally between the skeins.

The dyed skein shows outstanding lightfastness when exposed in a Xenon Fadometer.

EXAMPLE III

A dyebath is prepared as in Example II. A 10 g. piece of tufted carpet as described above made from T-844, T-845, T-846 and T-847 BCF nylon (DuPont) is entered into the dyebath. The dyebath is heated to the boil and the carpet is turned in the boiling bath for one hour. The carpet is removed, soaped, rinsed and dried.

The bands varied in shade from deep reddish-yellow on the T-847 deep dyeable acid dyeable nylon to white (undyed) on the T-844 cationic dyeable nylon. When the carpet was compared with a similarly dyed banded carpet dyed with conventionally employed acid dyes, staining on the cationic dyeable nylon and the shade of the dye on the various bands were as indicated in Table I.

EXAMPLE IV

The dye according to the process of the invention, Acid Orange 50, which has the structure:

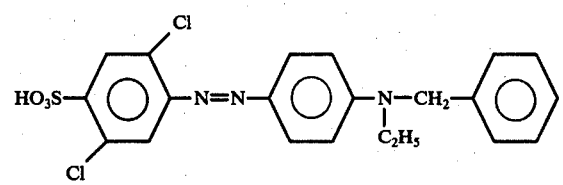

is used to dye the banded carpet described in Example III. The stain on the T-844 cationic dyeable nylon was judged as indicated in Table I vs. the conventionally employed dyes.

EXAMPLES V – VII

Using the procedure of Example I dyes according to the process of the invention were prepared as shown in the chart below read in light of the general formula. When dyed on banded nylon carpet according to Example III, the dyes showed the staining characteristics set forth in Table I.

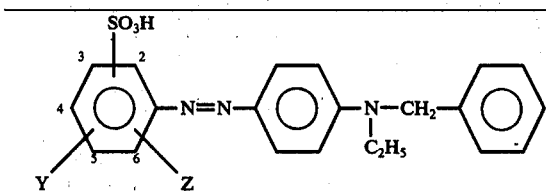

| Example | —SO$_3$H | Y | Z | Shade |
|---|---|---|---|---|
| V | 4- | H | H | Bright Yellow |
| VI | 3- | H | H | Bright Yellow |
| VII | 3- | 4-Cl | H | Reddish Yellow |

TABLE I

| | 0.5% DYEINGS COLOR DISTRIBUTION AND SHADE CHANGE (IN PARENTHESES) | | | | |
|---|---|---|---|---|---|
| | CATIONIC | LIGHT ACID | MEDIUM ACID | DEEP ACID | |
| DYE | T-844 | T-845 | T-846 | T-847 | SHADE VS. DYE OF EXAMPLE I |
| Dye of Example I | 0 | 2-3 | 4 | 5 | — |

TABLE I-continued

| | 0.5% DYEINGS COLOR DISTRIBUTION AND SHADE CHANGE (IN PARENTHESES) | | | | |
|---|---|---|---|---|---|
| DYE | CATIONIC T-844 | LIGHT ACID T-845 | MEDIUM ACID T-846 | DEEP ACID T-847 | SHADE VS. DYE OF EXAMPLE I |
| Acid Yellow 38 (disazo) | 0 | 2–3 | 4 | 5(D) | Yellower |
| Direct Yellow 44 (disazo) | 1–2 | 2–3 | 4 | 5(D) | Yellower |
| Acid Yellow 19 (monoazo) | 0 | 1–2 | 4 | 5(D) | Much Greener |
| Mordant Orange 6 (disazo) | 1–2 | 2–3 | 4 | 5(D) | Redder |
| Acid Orange 128 | 0 | 2–3 | 4(D) | 5(D) | Redder & Duller |
| Acid Yellow 198 | 0 | 2–3 | 4 | 5(D) | Approximately Equal |
| Acid Yellow 159 (disazo) | 0 | 2–3 | 4 | 5(D) | Approximately Equal |
| Acid Yellow 217 | 0 | 2–3 | 4 | 5(D) | Approximately Equal |
| Dye of Example IV | 0 | 2–3 | 4 | 5(D) | Much Redder |
| Dye of Example V | 0 | 2–3 | 4 | 5 | Yellower |
| Dye of Example VI | 0 | 2–3 | 4 | 5 | Yellower |
| Dye of Example VII | 0 | 2–3 | 4 | 5 | Approximately Equal |

Shade Change Key
B = Bluer
D = Duller
R = Redder
W = Weaker
Y = Yellower

Color Distribution Key
0 = Reserved
1 = Slight Stain
2 = Considerable stain
3 = Medium Color
4 = Medium to Heavy Color
5 = Dark Color

EXAMPLE VIII

A dyebath is prepared from 0.1 g. of Basic Red 17, 330 ml. water, 10 ml. 10% monosodium phosphate and 0.2 g. of a dyeing assistant ("Aminogen 41", a commercially available anionic material). The pH is adjusted to 6.0 with 5% aqueous acetic acid or 5% aqueous sodium hydroxide. A 10 g. piece of tufted carpet made from T-844, T-845, T-846 and T-847 BCF nylon (DuPont) is entered into the bath at 90° F. The bath is heated to the boil at 2° F/min. When the bath reaches 120° F, 0.2 g. of the dye of Example I is added. Heating is continued to the boil. The dye bath is maintained at the boil for 1 hour. The carpet is turned continuously during the dyeing operation. The carpet is removed, rinsed with cold water and dried.

The band of T-844 carpet is dyed red and the T-845, T-846 and T-847 carpet is dyed reddish-yellow. The latter three bands of carpet are similar in shade and strength to the bands of the carpet dyed in Example II.

Although the invention has been described in conjunction with the foregoing examples and preferred embodiments, it is not to be limited to these embodiments, but instead is intended to include all those embodiments within the scope and spirit of the appended claims.

What is claimed is:

1. In a process for dyeing nylon carpet material tufted or woven of cationic dyeable nylon yarn and acid dye dyeable nylon yarn wherein the nylon carpet material is contacted with a cationic dye and an acid dye in a dyebath, the improvement comprising employing as the acid dye, a monoazo dye of the formula:

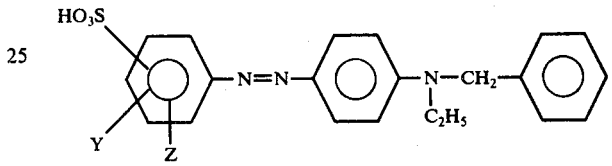

or its water soluble sulfonic acid salt, in which Y and Z are independently selected from the group consisting of hydrogen, chlorine, bromine, methyl and methoxy.

2. The process according to claim 1 in which the dye is

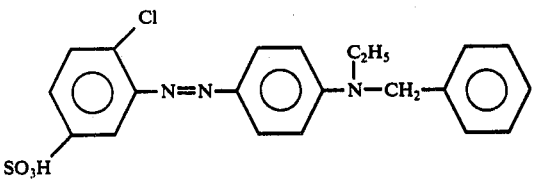

3. The process according to claim 1 in which the dye is

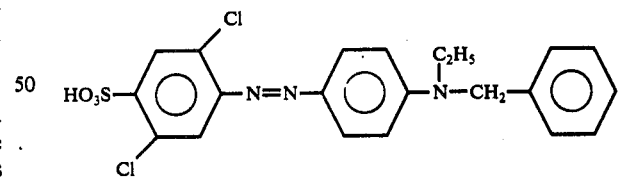

4. The product of the process of claim 1.